(12) United States Patent
Gourmel et al.

(10) Patent No.: US 11,423,613 B2
(45) Date of Patent: *Aug. 23, 2022

(54) METHOD FOR GENERATING SPLINES BASED ON SURFACE INTERSECTION CONSTRAINTS IN A COMPUTER IMAGE GENERATION SYSTEM

(71) Applicant: Unity Technologies SF, San Francisco, CA (US)

(72) Inventors: Olivier Gourmel, Wellington (NZ); Paolo Selva, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,556

(22) Filed: Oct. 27, 2021

(65) Prior Publication Data

US 2022/0051478 A1    Feb. 17, 2022

Related U.S. Application Data

(63) Continuation of application No. 17/179,291, filed on Feb. 18, 2021, now Pat. No. 11,189,090, which is a (Continued)

(51) Int. Cl.
  *G06T 13/40* (2011.01)
  *G06T 13/20* (2011.01)
  (Continued)

(52) U.S. Cl.
  CPC .............. *G06T 17/10* (2013.01); *G06T 13/40* (2013.01); *G06T 19/00* (2013.01)

(58) Field of Classification Search
  None
  See application file for complete search history.

(56) References Cited

U.S. PATENT DOCUMENTS 8,982,157 B2    3/2015    Weber et al.
11,189,090 B1*  11/2021   Gourmel ................. G06T 13/40
(Continued)

FOREIGN PATENT DOCUMENTS

EP          2157550         2/2010

OTHER PUBLICATIONS

Panozzo et al., Weighted Averages on Surfaces. 2013.
(Continued)

*Primary Examiner* — Tize Ma
(74) *Attorney, Agent, or Firm* — Haynes and Boone, LLP

(57) ABSTRACT

A representation of a surface in a three-dimensional space is obtained. A first input representing a starting point and a second input representing a next point are obtained. A representation of a surface-aware spline comprising vertices is generated, with the representation of the surface-aware spline including a starting vertex corresponding to the starting point and a next vertex corresponding to the next point. First and second projection points corresponding to projections of a first vertex and a second vertex onto the surface are determined. New points corresponding to equal distance points for the first and second vertices aligned with the first and second projection points are determined, and a rigid transformation is determined from the new points. The representation of the surface-aware spline is adjusted based on a transformation of the new points using the rigid transformation.

20 Claims, 8 Drawing Sheets

Related U.S. Application Data continuation of application No. 17/098,198, filed on Nov. 13, 2020.

(60) Provisional application No. 63/032,409, filed on May 29, 2020.

(51) Int. Cl.
*G06T 17/10* (2006.01)
*G06T 19/00* (2011.01)

(56) References Cited

U.S. PATENT DOCUMENTS

| | | |
|---|---|---|
| 2009/0091575 A1 | 4/2009 | Borac et al. |
| 2010/0299106 A1 | 11/2010 | Audoly et al. |
| 2014/0164998 A1* | 6/2014 | Jadhav ................ G11B 27/105 715/810 |
| 2014/0198108 A1 | 7/2014 | Sigal et al. |

OTHER PUBLICATIONS

Sunil Hadap, "Oriented Strands—dynamics of stiff multi-body system", Eurographics/ ACM SIGGRAPH Symposium on Computer Animation (2006), M.-P. Cani, J. O'Brien (Editors) (Year: 2006).

* cited by examiner

ME THOD FOR GENERATING SPLINES BASED ON SURFACE INTERSECTION CONSTRAINTS IN A COMPUTER IMAGE GENERATION SYSTEM

CROSS-REFERENCE TO RELATED APPLICATIONS

This application is a continuation of U.S. Non-Provisional patent application Ser. No. 17/179,291, filed Feb. 18, 2021, which is a continuation of U.S. Non-Provisional patent application Ser. No. 17/098,198, filed Nov. 13, 2020, which claims priority to and the benefit of U.S. Provisional Patent Application No. 63/032,409, filed May 29, 2020, which are incorporated herein by reference in their entirety.

FIELD

The present disclosure generally relates to computer-based methods of procedurally generating representations of three-dimensional splines and more particularly to techniques and systems for generating representations of fibers in a virtual space that are constrained from intersecting a virtual surface in the virtual space and usable for image generation.

BACKGROUND

As digital animation in movies and games has increased in popularity, so has the complexity of the models and the virtual environments in which they interact. Various tools (e.g., physics engines) have been developed to create realistic interactions between objects. However, simulating realistic fibers (such as hair, fur, feathers, etc.) is a challenge and limitations of available computing power and other considerations often led to undesirable tradeoffs between realism in imagery and limiting use of computational resources.

For example, simulating hair may involve complex differential equations that greatly increase computational resource consumption the longer and more numerous the hairs are. Furthermore, if a digital artist needs to make changes to such simulated hair, the process can be laborious, time-consuming, and involve much experimentation and trial and error to manipulate the hair into a proper or visually appealing position.

SUMMARY

Techniques and systems described below relate to generating digital fibers in a virtual space that are constrained from intersecting a virtual surface in the virtual space. In one example, a representation of a curved surface in a three-dimensional space is obtained. In the example, a first input representing a position of a starting point of a surface-aware spline that is on, or relative to, the curved surface is obtained. In the example, a second input representing a next point of the surface-aware spline is obtained. Still in the example, representation of the surface-aware spline comprising N vertices is generated, including a first vertex and a second vertex, with the representation of the surface-aware spline including a starting vertex corresponding to the starting point and a next vertex corresponding to the next point. Still further in the example, first projection point corresponding to a first projection of the first vertex onto the curved surface is determined.

Further in the example, a second projection point corresponding to a second projection of the second vertex onto the curved surface is determined. Still in the example, new points corresponding to equal distance points for the first and second vertices aligned with the first and second projection points are determined. A bending rigid transformation might be determined from the new points. The representation of the surface-aware spline might be adjusted based on a transformation of the new points using the bending rigid transformation.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, objects can be represented in computer memory by a data structure defining a mathematical representation of a two-dimensional (2D) or three-dimensional (3D) physical item or being. The representation might be stored as a mesh of vertices defining a tessellated manifold of a boundary for the object, and a texture for coloring that boundary. In some examples, a mesh can be represented in memory as data structures referring to a collection of vertices, edges, and/or faces that defines the shape of a polyhedral object in computer graphics modeling. In some examples, a scene can be represented as data structures referring to a virtual workspace for editing and/or rendering a three-dimensional project. In some examples, an interface might be computer hardware or software designed to communicate information between hardware devices, between software programs, between devices and programs, or between a device and a user.

In an example computer image generation process, a digital artist or other image creator might want to generate an image including objects, such as a head, a person, a box, etc. and fibers (e.g., hair, rope, braid, etc.) wherein the number of fibers is high enough that it might be impractical to have the creator manually specify the positions of each fiber, while avoiding visual artifacts such as fibers intersecting surfaces or intersecting themselves. In some embodiments, it might be desirable to have a computer process place the fibers according to some procedural constraints, which might be specified by the creator using a computer interface. For example, a fiber might be represented as a piecewise linear curve or a parameterized curve, such as a cubic curve, a Bezier curve, a line segment, etc. and "placing" that fiber into a scene with other objects might be done by specifying parameters of the curve. For a line segment, it might be sufficient to specify two end points and for a cubic spline, it might be sufficient to specify two end points and a tangent vector at each end point.

Figure 1A:
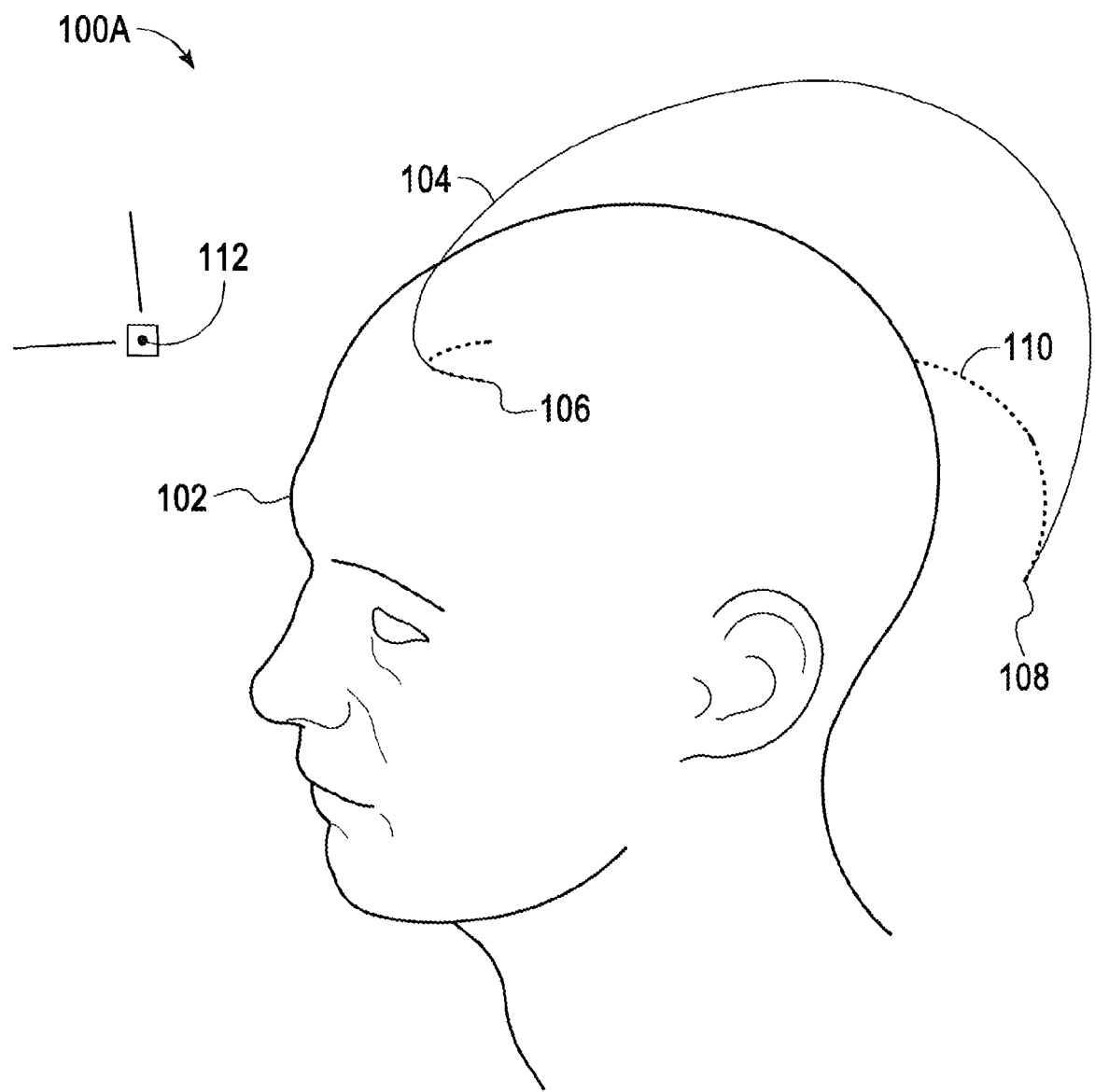
FIGS. 1A-1C are diagrams that illustrate procedurally simulating a fiber in accordance with an embodiment.
Figure 1B:
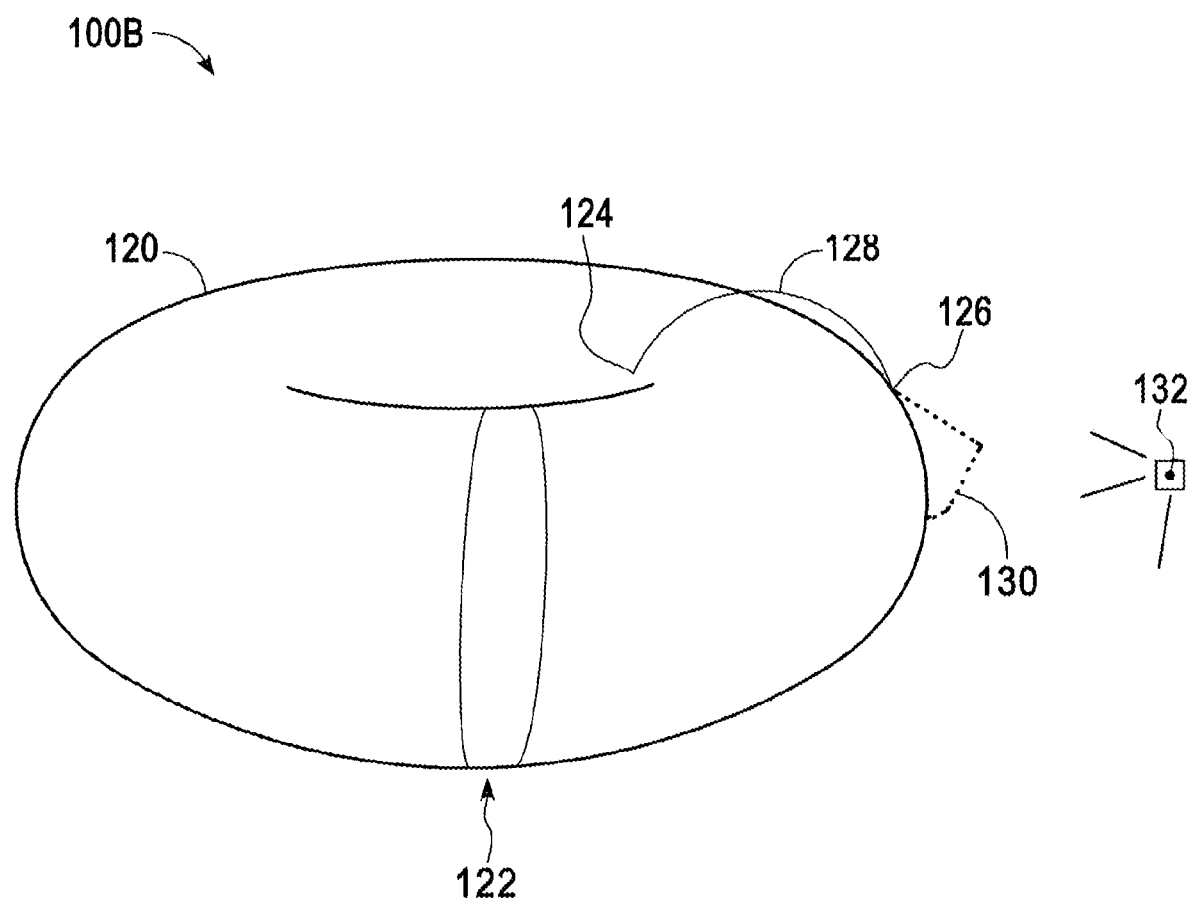
Figure 1C:
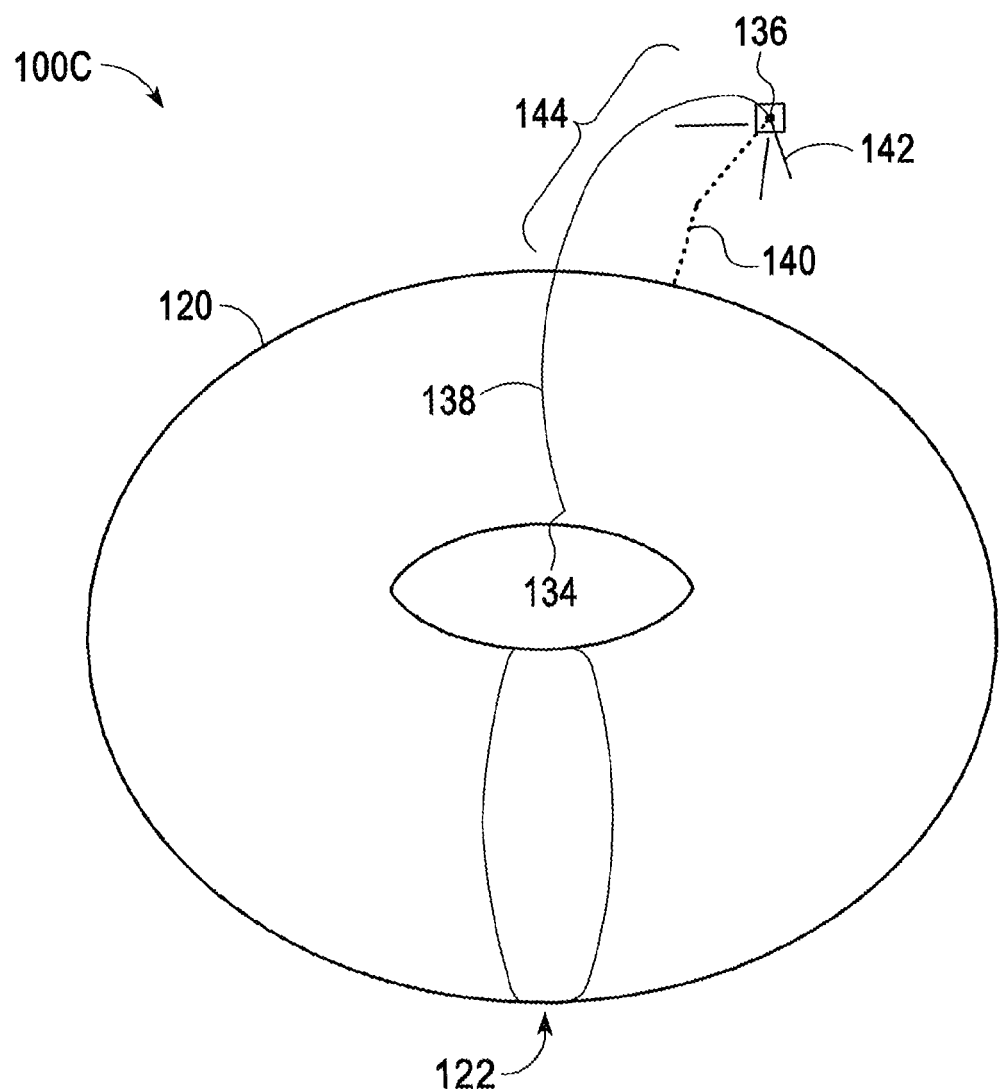

FIGS. 1A-1C illustrate procedural simulations 100a, 100b, and 100c of hair or another fiber in accordance with of an embodiment of the present disclosure. Specifically, FIG. 1A depicts a spline 104 that has been generated to represent a fiber on a digital model 102 of a head starting from start point 106 and ending at end point 108. Cursor 112 may be used to modify one or more parameters of spline 104, such as a velocity associated with the spline or to move start point 106 or end point 108. Dashed line 110 illustrate a spline without a constraint preventing the spline from intersecting a surface of digital model 102, whereas, as can be seen in FIG. 1, spline 104 is constrained in a manner described in the present disclosure such that it does not intersect with the surface of the model except possibly at starting point 106.

Figure 4:
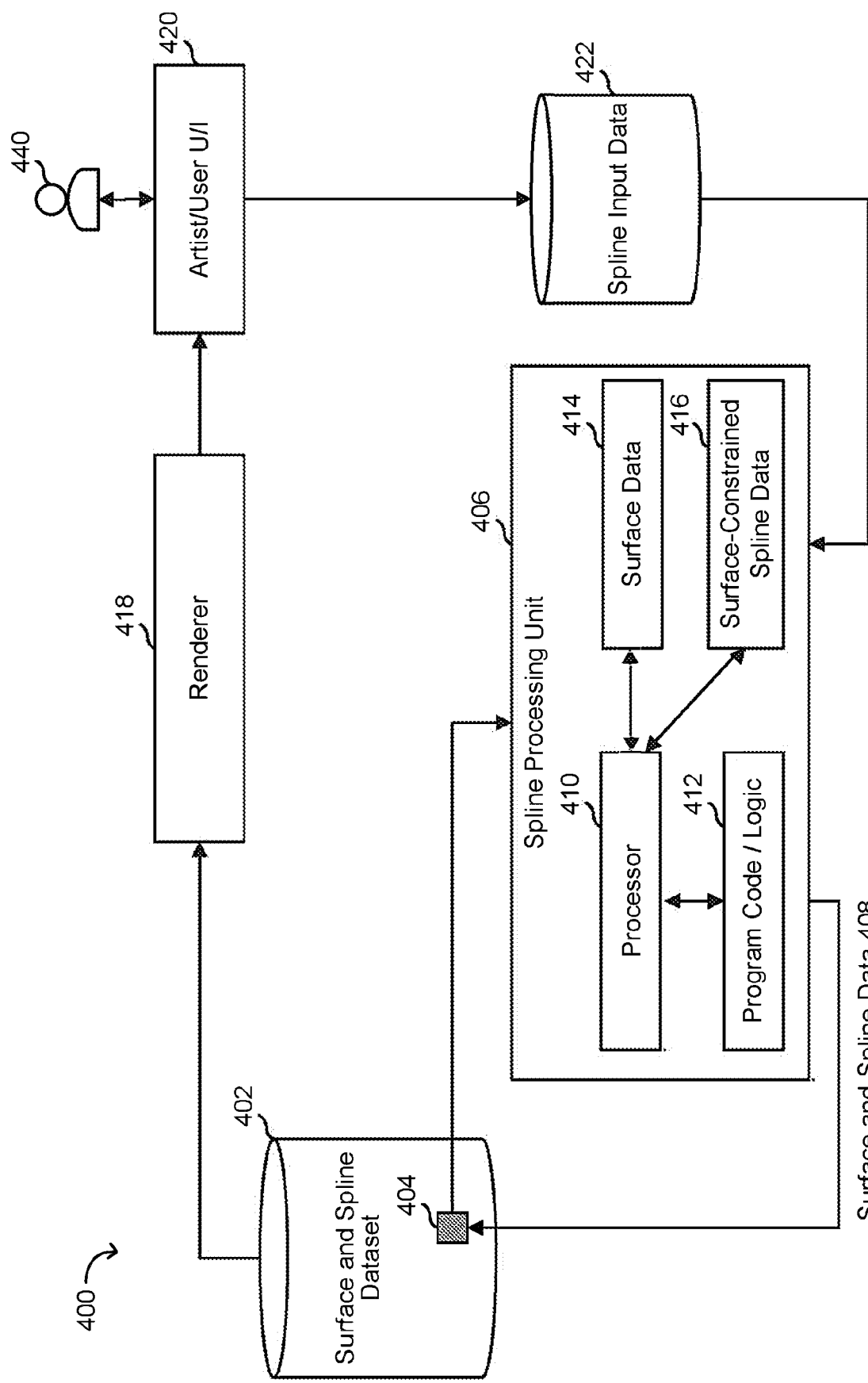
FIG. 4 is a system for generating and placing one or more surface-constrained splines within a computer animation in accordance with an embodiment.

Procedural simulation 100a depicted in FIG. 1A may be produced by execution of software on one or more computer systems (e.g., each like a computer system 400 illustrated in FIG. 4). A visual content generation system 500 (see FIG. 5) may be configured to receive the values of the one or more parameters as input and output a simulation, such as procedural simulation 100a, as one or more static images and/or one or more animated videos. For example, data corresponding to procedural simulation 100a may be supplied to an animation creation system 530, which may output procedural simulation 100a (such as to an animation sequence storage 538, a scene description storage 536, an object storage 534, and/or a data store 532).

Digital model 102 may be visual representation of a two-dimensional or three-dimensional object. For illustrative purposes only, digital model 102 of FIG. 1A is depicted as a human head. Digital model 102 may be comprised of multiple two-dimensional polygons, and the plane regions of such polygons may comprise the surface (e.g., skin) of digital model 102. In various embodiments, the surface of digital model 102 may be represented in memory as a constraint on spline 104, in which case, a program that processes the surface might take the surface of digital model 102 into account to ensure that spline 104 passes around or lies on top of or above the surface, but does not go through the surface. In this manner, techniques of the present disclosure may be utilized to generate realistic hair and/or other flexible fibers that appear to react to the surfaces of models as if they were solid. The process might also deal with splines that are automatically placed so that not only do they not intersect a given surface and avoid a negative distance above the surface, but they flow with a particular positive and nonzero distance from a surface. For example, one spline might be automatically placed so that it originates at a point on a surface with a particular initial tangent, but also is positioned so that much of the spline is positioned some distance from the surface, as might be represented by a geodesic of the surface.

Spline 104 may be a polynomial curve in 2D or 3D space. In some embodiments, spline 104 is a cubic spline comprising a plurality of segments between points on the spline, where each segment is a third-degree polynomial. Further, the cubic spline may be a bicubic spline usable to interpolate data points into pixels for display. Spline 104 may begin at start point 106 and end at end point 108 or vice versa. The curvature of spline 104 may be specified by inputs form a user (e.g., through manipulation of cursor 112).

Start point 106 may be a point from which generation of spline 104 begins. In some embodiments, start point 106 is also associated with a start point tangent plane (not shown) that runs through start point 106. An orientation of the start point tangent plane may affect the curvature of spline 104. In some embodiments, a velocity value at the start point tangent plane may likewise affect the curvature of spline 104. For example, the velocity value may cause the curve to move farther from the surface, but the curvature of spline 104 will still follow the natural curvature of the surface. In some embodiments, the orientation of the start point tangent plane and/or velocity can be controlled by the user manipulating cursor 112, such as via input device 614 or cursor control 616 of FIG. 4. Additionally or alternatively, in some embodiments the orientation of the start point tangent plane may be affected by the surface of digital model 102; for example, the start point tangent plane at start point 106 may be based on a normal to a curve of the surface of digital model 102 at start point 106.

End point 108 may be a point at which generation of spline 104 ends. In some embodiments, end point 108 is also associated with an end point tangent plane (not shown) different from the start point tangent plane. An orientation of the end point tangent plane may likewise affect the curvature of spline 104.

Dashed line 110 may be a line that indicates the path that spline 104 would have followed had it not been prevented from intersecting digital model 102 in accordance with the techniques of the present disclosure. In some implementations, dashed line 110 may be shown via an interface on a client device as a reference to assist a digital artist. In other implementations, dashed line 110 may not be present.

Cursor 112 may be a graphical indicator used to show a current position for user interaction on a graphical display device. The position and/or orientation of cursor 112 may be controlled by a user via an input device such as input device 614 or cursor control 616 of FIG. 4. Change in position or orientation of cursor 112 may affect characteristics of spline 104 (e.g., changing a tangent value, changing a velocity, moving the position of end point 108 or start point 106, etc.), which may affect the path followed by the curve of spline 104.

FIG. 1B illustrates a procedural simulation 100b depicting a 3D model 120 rendered by a computer animation system, such as computer system 400. As with FIG. 1A, visual content generation system 500 may be configured to receive the values of the one or more parameters as input and output a simulation, such as procedural simulation 100b, as one or more static images and/or one or more animated videos. For example, data corresponding to procedural simulation 100b may be supplied to animation creation system 530, which may output procedural simulation 100b (such as to animation sequence storage 538, scene description storage 536, object storage 534, and/or data store 532).

3D model 120 of FIG. 1B includes a surface 122 having surface dimensions, curvature, and the like, which define 3D model 120 and are used to constrain one or more splines generated to represent fibers over 3D model 120. Procedural simulation 100b of FIG. 1B further depicts a surface-constrained spline 128 that has been generated to represent the fiber on 3D model 120 from a start point 124 to an end point 126. An unconstrained spline 130 illustrates a spline without a constraint preventing the spline from intersecting a surface of 3D model 120, such as surface 122, whereas, as can be seen in FIG. 1, surface-constrained spline 128 is constrained in a manner described in the present disclosure such that it does not intersect with surface 122 of 3D model 120.

When modeling surface-constrained spline 128, initially unconstrained spline 130 may be used to define at least a portion the shape of the corresponding underlying structure, such as by the polynomials or other functions that make up unconstrained spline 130 (e.g., a cubic spline). However, when manipulating unconstrained spline 130 in procedural simulation 100b, changing a point along unconstrained spline 130, including the start or end point of unconstrained spline 130, may cause unconstrained spline 130 to intersect one or more points or areas along surface 122 of 3D model 120. This may be caused when the changed or adjusted points are nearby a surface, on opposite surfaces of 3D model 120 (e.g., an inner and outer surface), or the like. For example, when unconstrained spline 130 travels from start point 124 to end point 126, unconstrained spline travels through 3D model 120 (not shown) and exits as shown in the dashed line nearby end point 126. In such examples, unconstrained spline 130 may not be able to properly represent the fiber travelling over or nearby (e.g., directly on the surface or at a distance from the surface). In order to properly represent such a fiber using unconstrained spline 130, multiple additional points (e.g., tens, hundreds, or thousands) may be required to be placed at or over surface 122 in order to cause the functions representing unconstrained spline 130 to properly represent such a fiber without intersecting surface 122. This causes computational disadvantages by requiring additional data, points, and functions to represent the spline, as well as requiring significant time and effort to select the proper spline points.

Thus, placing a fiber that is meant to wrap from a point on the inner circular surface to the outer circular surface, would cause unconstrained spline 130 to intersect surface 122. In order to properly represent such a fiber, surface-constrained spline 128 further uses points over the surface and projected on to the surface, with tangent planes of these projected points, to represent a further discreet function that allows surface-constrained spline 128 to be placed on or over surface 122. A user, such as an animator, may adjust start point 124 and end point 126 to cause the fiber represented as surface-constrained spline 128 to move in different directions and to different placements over surface 122. A tool 132 in procedural simulation 100b may be controlled by a user in order to select points along surface-constrained spline 128, such as start point 124, a subsequent or next point along surface-constrained spline 128, and/or end point 126, as well as tangents and tangent planes at these points. For example, surface-constrained spline 128 is shown with a curvature near end point 126 along or nearby surface 122, which may be made by controlling a point prior to the end point, as well as the tangent planes defined at these points. This may include assigning points of attraction that cause the curvature of surface-constrained spline 128 to bend in particular directions. Further the overall curvature, including direction, orientation, and the like, may be controlled using these tangent planes at these points and velocities of curvature along the spline.

FIG. 1C includes procedural simulation 100c depicting 3D model 120 (shown in procedural simulation 100b of FIG. 1B) rendered by a computer animation system, such as computer system 400. As with FIGS. 1A and 1B, visual content generation system 500 may be configured to receive the values of the one or more parameters as input and output a simulation, such as procedural simulation 100c, as one or more static images and/or one or more animated videos. For example, data corresponding to procedural simulation 100c may be supplied to animation creation system 530, which may output procedural simulation 100c (such as to animation sequence storage 538, scene description storage 536, object storage 534, and/or data store 532).

3D model 120 in procedural simulation 100c is similarly shown with surface 122 having surface dimensions, curvature, and the like, which define 3D model 120 and are used to constrain one or more splines generated to represent fibers over 3D model 120. Procedural simulation 100c of FIG. 1C shows a representation of a surface-constrained spline 138 having a start point 134 and an end point 136, where in contrast to FIG. 2B, end point 136 is not placed directly on surface 122 and therefore surface-constrained spline may not travel directly over surface 122. In order to define at least a portion of the functions, curvature, and/or points of or along surface-constrained spline 138, an unconstrained spline 140, such as a cubic spline, is shown in procedural simulation 100c. Unconstrained spline 140 may start at the same or similar start point 134 of surface-constrained spline 138 and travel to or nearby end point 136, intersecting or being curved to or nearby any points of interest or attraction, which defines the function(s) of unconstrained spline 140 (e.g., the polynomials or other functions meant to represent unconstrained spline 140). However, as shown in procedural simulation 100c, unconstrained spline 140 intersects surface 122 when traveling from start point 134 to end point 136, shown as the dashed line exiting 3D model 120. Thus, surface-constrained spline 138 may be established having functions and equations that define the curvature, direction, and placement of surface-constrained spline 138 using the surface dimensions, curvature, and the like of surface 122, thereby preventing surface intersection.

A tool 142 may be used to move end point 136 away and apart from surface 122 so that surface-constrained spline 138 may include an area under a curve 144 that is not located directly on surface 122, which may change the calculations and curvature of surface-constrained spline 138 (e.g., the function representing surface-constrained spline 138 that considers surface 122). Tool 142 may be used to adjust the points along and/or at the ends of surface-constrained spline 138, which may include removal of such points from surface 122. This may occur while surface-constrained spline 138 is still constrained by surface 122 to prevent any intersections with surface 122. A change in the points may also include a change in tangent planes and/or velocities at points along surface-constrained spline 138, which may be provided through tool 142. Further, tool 142 may be used to place or adjust points of attraction to cause changes in the curvature, angle, placement, or orientation of surface-constrained spline 138, such as by moving portions or all of surface-constrained spline 138 towards or to intersect one or more of these points of attraction. Calculation of the curvature of spline 104 and surface-constrained splines 128 and 138 in FIGS. 1A-C may be performed as discussed herein, for example, using the calculations and equations discussed in reference to FIGS. 2A-C.

Figure 2A:
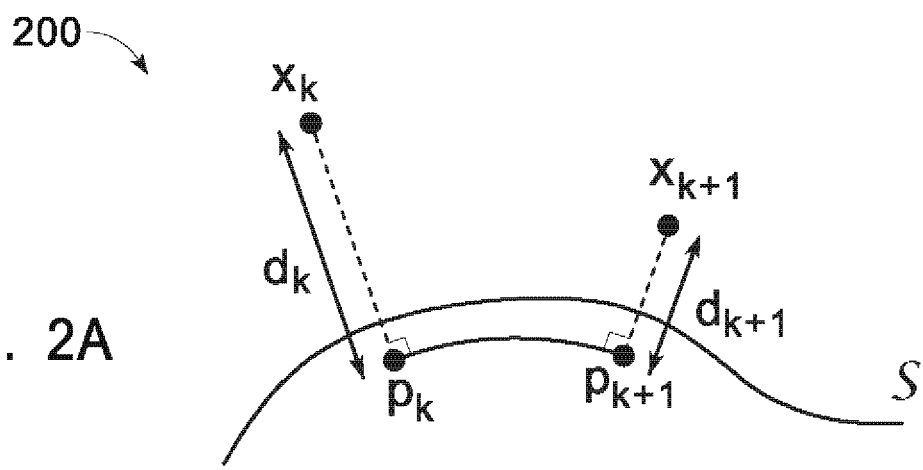
FIGS. 2A-2C are diagrams that illustrate unbending a curve in accordance with an embodiment.
Figure 2B:
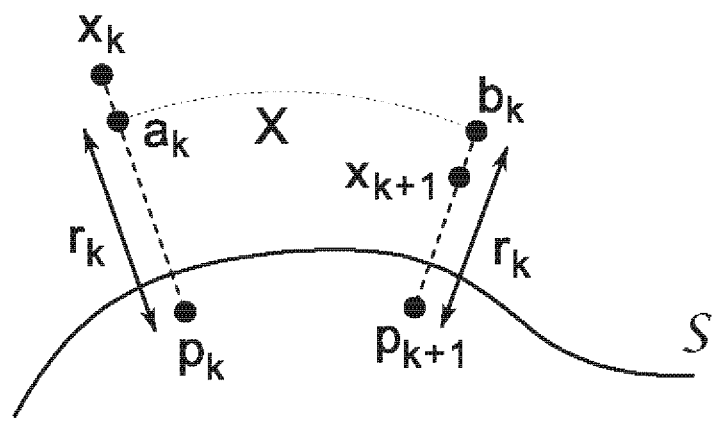
Figure 2C:
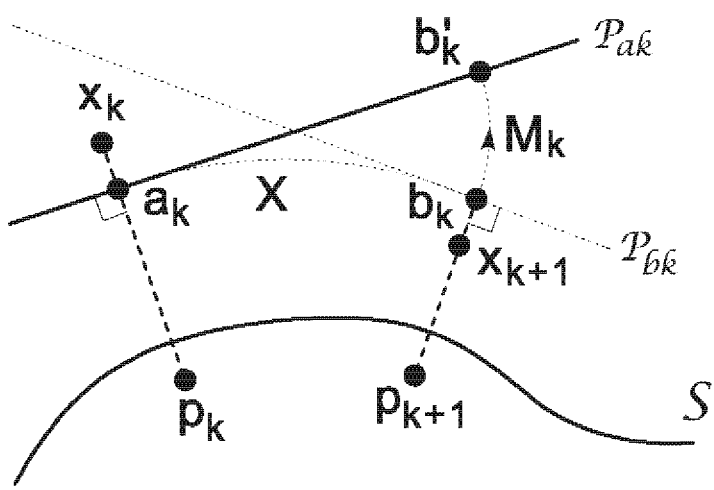

FIGS. 2A-2C illustrate examples 200 of an embodiment of the present disclosure. Specifically, FIGS. 2A-2C illustrate an estimation of a rigid transformation $M_k$ that cancels the bending component between consecutive curve samples $x_k$ and $x_{k+1}$ in accordance with an embodiment. In FIGS. 2A-2C, a surface $S$ is intended to represent a curve of surface of a model; for example, surface $\mathcal{S}$ may be a portion of the surface of digital model 102 of FIG. 1. Note that the elements depicted in FIGS. 2A-2C are shown in a two-dimensional cross-section of a 3D space for ease of illustration. Techniques of the present disclosure may be operable to compute a smooth parametric curve, $\mathcal{C}$, between two points A and B on the same side as surface $\mathcal{S}$ such that the derivative of the curve $\mathcal{C}$ at the point A is $V_A$, the derivative of the curve $\mathcal{C}$ at the point B is $V_B$, and the curve $\mathcal{C}$ follows the topology of surface $\mathcal{S}$ without intersecting surface $\mathcal{S}$ except possibly at a starting point, $x_1$, (not shown) of the curve $\mathcal{C}$.

In an embodiment, the curve $\mathcal{C}$ may be represented in memory and processing by a succession of N sample points (e.g., $x_1, x_2, \ldots, x_N$). In some embodiments, number of samples N may be a user-defined parameter. The concatenation of all samples points in a single vector may be denoted by X in Equation 1.

$$X = \begin{pmatrix} x_1 \\ x_2 \\ \vdots \\ x_N \end{pmatrix} \qquad \text{(Eqn. 1)}$$

In the discrete domain, the constraints at the end points of the curve $\mathcal{C}$ may be expressed as in Equation 2.

$$A = x_1 \qquad \text{(Eqn. 2)}$$
$$B = x_N$$
$$V_A = \frac{-3x_1 + 4x_2 - x_3}{2N}$$
$$V_B = \frac{x_{N-2} - 4x_{N-1} + 3x_N}{2N}$$

In a case without surface $\mathcal{S}$, such a smooth curve may be obtained by solving Equation 3, where L is a linear operator subject to Equation 2 that evaluates to an (approximate) second derivative at each sample as in Equation 4.

$$L^2(X) = 0 \qquad \text{(Eqn. 3)}$$

$$L = \begin{pmatrix} 1 & -2 & 1 & 0 & 0 & \\ 0 & 1 & -2 & 1 & 0 & \ldots \\ 0 & 0 & 1 & -2 & 1 & \\ & & & \vdots & & \ddots \end{pmatrix} \qquad \text{(Eqn. 4)}$$

A technique of the present disclosure is to modify operator L so that it computes a second derivative that takes into account the local curvature of surface $\mathcal{S}$ in the vicinity of each sample. For example, if three consecutive samples $x_{k-1}$, $x_k$, $x_{k+1}$ are equally spaced on a geodesic path of surface $\mathcal{S}$ (e.g., a path of shortest length), then operator L should evaluate to 0 at $x_k$.

In some implementations, an automatic spline generator might initialize a seeking process using an initial curve, $X^0$, that joins A to B. The initial curve, $X^0$, need not be constrained to respect all the constraints of Equation 2, though convergence may be affected if this initial curve is positioned too far from the optimal solution. In some embodiments, an approach is to start from an approximate geodesic path on surface S that joins projections, $P_A$ and $P_B$, of A and B onto surface $\mathcal{S}$.

The automatic spline generator might then iteratively refine the curve as follows:

1. Compute $P^i = (p_1, p_2, \ldots, p_N)$, which is the projection of the current curve $X^i$ onto surface $\mathcal{S}$.
2. Construct a discrete second derivative that compensates for the curvature of surface $\mathcal{S}$ at each point $p_k$, referred to in the present disclosure as new curvature-compensated operator $L_{c_i}$. $L_{c_i}$ is indexed by i because $L_c$ is updated at each step; that is, with each new curve the system of the present disclosure computes a new set of transformations $M_k$ (see below) and form a new operator $L_c$.
3. Compute a new curve $X^{i+1}$ solution of the curvature-compensated operator $L_{c_i}^2(X^i) = 0$ subject to (1).
4. Check for convergence: if $\|X^{i+1} - X^i\| < \in$ (where $\in$ may be a pre-defined threshold) then terminate the algorithm. Otherwise return to 1.

FIGS. 2A-2C illustrate techniques for an automatic curve generator to generate a curve corresponding to a local bending of a surface $\mathcal{S}$ between consecutive curve points using rigid transformations (rotations).

In FIG. 2A, $x_k$ and $x_{k+1}$ represent a pair of adjacent curve samples (e.g., points in 3D space), and $p_k$ and $p_{k+1}$ represent their projection onto surface $\mathcal{S}$, with $d_k$ being a distance from $p_k$ to $x_k$, and $d_{k+1}$ being a distance from $p_{k+1}$ to $x_{k+1}$. In embodiments, $p_k$ and $p_{k+1}$ are points on surface $\mathcal{S}$ that are closest to their respective $x_k$ and $x_{k+1}$. If surface $\mathcal{S}$ is smooth, the normal to surface $\mathcal{S}$ at $p_k$ will point to $x_k$ and the normal to surface $\mathcal{S}$ at $p_{k+1}$ will point to $x_{k+1}$; for example, if surface $\mathcal{S}$ is a plane, then $p_k$ is the orthogonal projection of $x_k$ onto surface $\mathcal{S}$. Various techniques may be employed to find the closest $p_k$ to $x_k$ on surface $\mathcal{S}$, such as, for example, by partitioning surface $\mathcal{S}$ using tree structures (e.g., bounding volume hierarchy, k-d tree, etc.) in order to quickly find a first candidate, then refining the solution with iterations using algorithms such as a Gauss-Newton algorithm. Often, $d_k \neq d_{k+1}$, which may present a challenge in estimating the local bending at the $x_k$ because the displacement step from $x_k$ to $x_{k+i}$ is not tangential only. It may be easier to estimate the bending at $p_k$ but defining the operator L based on the bending at $p_k$ may yield inaccurate results if the $p_k$ and $x_k$ are too far apart. Instead, in FIG. 2B, the system of the present disclosure may be configured to compute new points $a_k$ and $b_k$ on segments $[p_k x_k]$ and $[p_{k+1} x_{k+1}]$ such that $a_k$ and $b_k$ are at the same distance $r_k$ from surface $\mathcal{S}$ by computing $r_k$ as the average of $d_k$ and $d_{k+1}$ as in Equation 5 so that $a_k$ and $b_k$ are close to the initial curve points in FIG. 2B. The bending from $a_k$ and $b_k$ will thus work as a good approximation of the bending between $x_k$ and $x_{k+1}$ in Equation 5.

$$r_k = \frac{d_k + d_{k+1}}{2} \qquad \text{(Eqn. 5)}$$

In FIG. 2C, the system determines plane $\mathcal{P}_{a_k}$, a plane that goes through point $a_k$ and whose normal vector is given by $x_k - p_k$. Similarly, the system determines plane $\mathcal{P}_{b_k}$, a plane that goes through point $b_k$ and whose normal vector is given by $x_{k+1} - p_{k+1}$ in FIG. 2C. In the absence of bending (e.g., when surface $\mathcal{S}$ is planar), $\mathcal{P}_{a_k}$ and $\mathcal{P}_{b_k}$ would be same plane. Consequently, in most cases the system of the present disclosure can compensate for the bending at $a_k$ by computing an appropriate transformation $M_k$ that projects plane $\mathcal{P}_{b_k}$ onto plane $\mathcal{P}_{a_k}$. In some embodiments of the present disclosure, such a transformation may be performed by adding the constraints such that $M_k$ is a rigid transformation (no scaling) and $M_k$ minimizes $\|b_k'-b_k\|^2+\|a_k'-a_k\|^2$ where $b_k'=M_k(b_k)$ and $a_k'=M_k^{-1}(a_k)$. The second constraint implies that $M_k$ is configured to preserve the position of $a_k$ and $b_k$ within a threshold, ideally as much as possible. Note that since $M_k$ projects $\mathcal{P}_{b_k}$ onto $\mathcal{P}_{a_k}$, its inverse $M_k^{-1}$ projects the plane $\mathcal{P}_{a_k}$ onto the plane $\mathcal{P}_{b_k}$.

The first constraint allows $M_k$ to be in matrix form. For any point p on surface $\mathcal{S}$, Equation 6 would be satisfied.

$$M_k(p)=R_k \cdot p+T_k \qquad \text{(Eqn. 6)}$$

In Equation 6, $R_k$ is a 3×3 rotation matrix and $T_k$ is a translation vector. Thus, Equation 7 would represent such operations.

$$M_k^{-1}(p)=R_k^T \cdot p - R_k^T T_k \qquad \text{(Eqn. 7)}$$

In this manner, $M_k$ is a rigid transformation (3×3 rotation and translation) that transforms the plane $\mathcal{P}_{a_k}$ into the plane $\mathcal{P}_{b_k}$, wherein every point of $\mathcal{P}_{b_k}$ should land on plane $\mathcal{P}_{a_k}$. The second constraint provides for canceling the effect of the bending of surface $\mathcal{S}$ while avoiding twisting by constraining $a_k$ and $b_k$ from moving within a threshold, which could prevent $a_k$ and $b_k$ from moving any more than necessary. Using the transformations $M_k$, the system of the present disclosure may be configured to derive the expression of curvature-compensated second derivatives ($\Delta$) using finite differences shown in Equations 8-9, which allows the curvature-compensated operator $L_c$ of the present disclosure to be expressed in matrix form as in Equation 10.

$$\Delta(x_k) = M_{k-1}^{-1}(x_{k-1}) - 2x_k + M_k(x_{k+1}) \qquad \text{(Eqn. 8)}$$

$$= R_{k-1}^T \cdot x_{k-1} - 2x_k + R_k \cdot x_{k+1} + T_k - R_{k-1}^T T_{k-1} \qquad \text{(Eqn. 9)}$$

$$L_c(X) = \begin{pmatrix} R_1^T & -2 & R_2 & 0 & 0 & \\ 0 & R_2^T & -2 & R_3 & 0 & \cdots \\ 0 & 0 & R_3^T & -2 & R_4 & \\ & & & & & \ddots \end{pmatrix} \begin{pmatrix} x_1 \\ x_2 \\ \vdots \\ x_N \end{pmatrix} + \begin{pmatrix} T_2 - R_1^T T_1 \\ T_3 - R_2^T T_2 \\ \vdots \\ T_N - R_{N-1}^T T_{N-1} \end{pmatrix} \qquad \text{(Eqn. 10)}$$

Thus, X may be computed by solving Equation 11 for X. In this manner, the curvature-compensated operator $L_c$ illustrated by Equation 11 allows the computation of "surface-aware" splines in an efficient way.

$$L_c^2(X)=0 \qquad \text{(Eqn. 11)}$$

The curvature-compensated operator $L_c$ may be used to compute paths (e.g., geodesic paths) on surfaces, to compute splines embedded in a surface, and/or to compute Riemannian surface-aware splines that automatically bend in the vicinity of a surface while following the curvature of the surface. Whereas computation of an embedding of a surface mesh in a high dimensional space may take minutes to precompute geodesic paths and splines on surfaces using weighted averages, with the technique described above there is no such overhead and the algorithm may be run quickly in real time.

The energy function of the system may present multiple local minimas, especially if there are concavities in the surface. In order to guarantee convergence, the system of the present disclosure ensures that each new curve $X^{i+1}$ brings an improvement over the previous solution $X^i$ by comparing their respective Laplacian energy as illustrated by Equation 12.

$$\|L_{c_{i+1}}(X^{i+1})\|^2 < \|L_{c_i}(X^i)\|^2 \qquad \text{(Eqn. 12)}$$

If Equation 12 is not satisfied, the system iteratively updates $X^{i+1}$ as shown in Equation. 13.

$$X^{i+1} \leftarrow \frac{X^i + X^{i+1}}{2} \qquad \text{(Eqn. 13)}$$

In this manner, the updated $X^{i+1}$ will always satisfy Equation 12 at some point because $X^i X^{i+1}$ is a descent direction for the Laplacian energy.

Equation, 11 may be a simple sparse/banded linear system because the matrix in $L_c$ is block tridiagonal. Thus, it can be solved in linear time (e.g., by computing its Cholesky factorization). This might allow for more efficient use of limited computational resources in procedurally placing objects in a virtual space.

Figure 3:
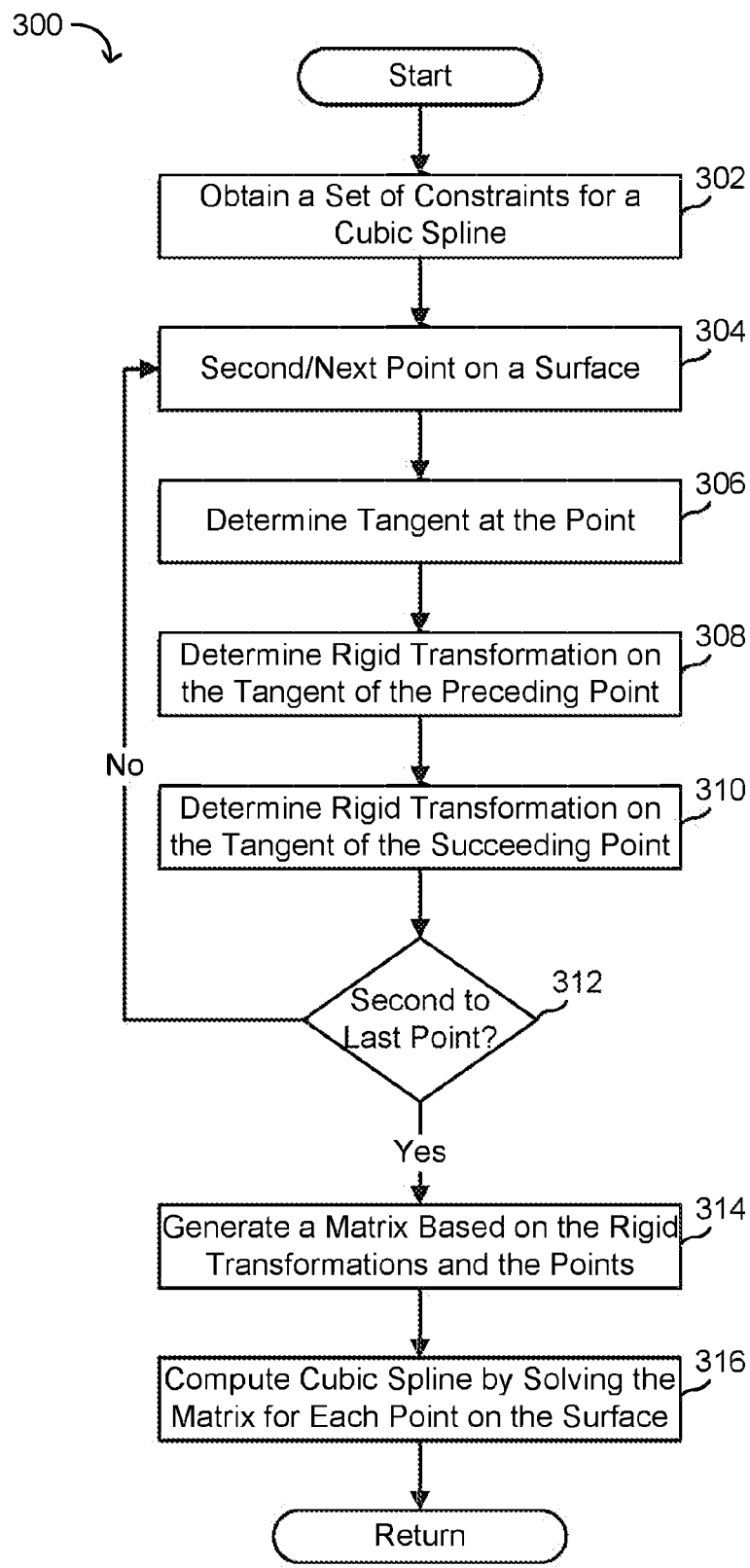
FIG. 3 is a flowchart that illustrates an example of procedurally simulating fiber in accordance with an embodiment.

FIG. 3 is a flowchart illustrating an example of a process 300 for procedurally generating a spline in accordance with various embodiments. Some or all of the process 300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 5:
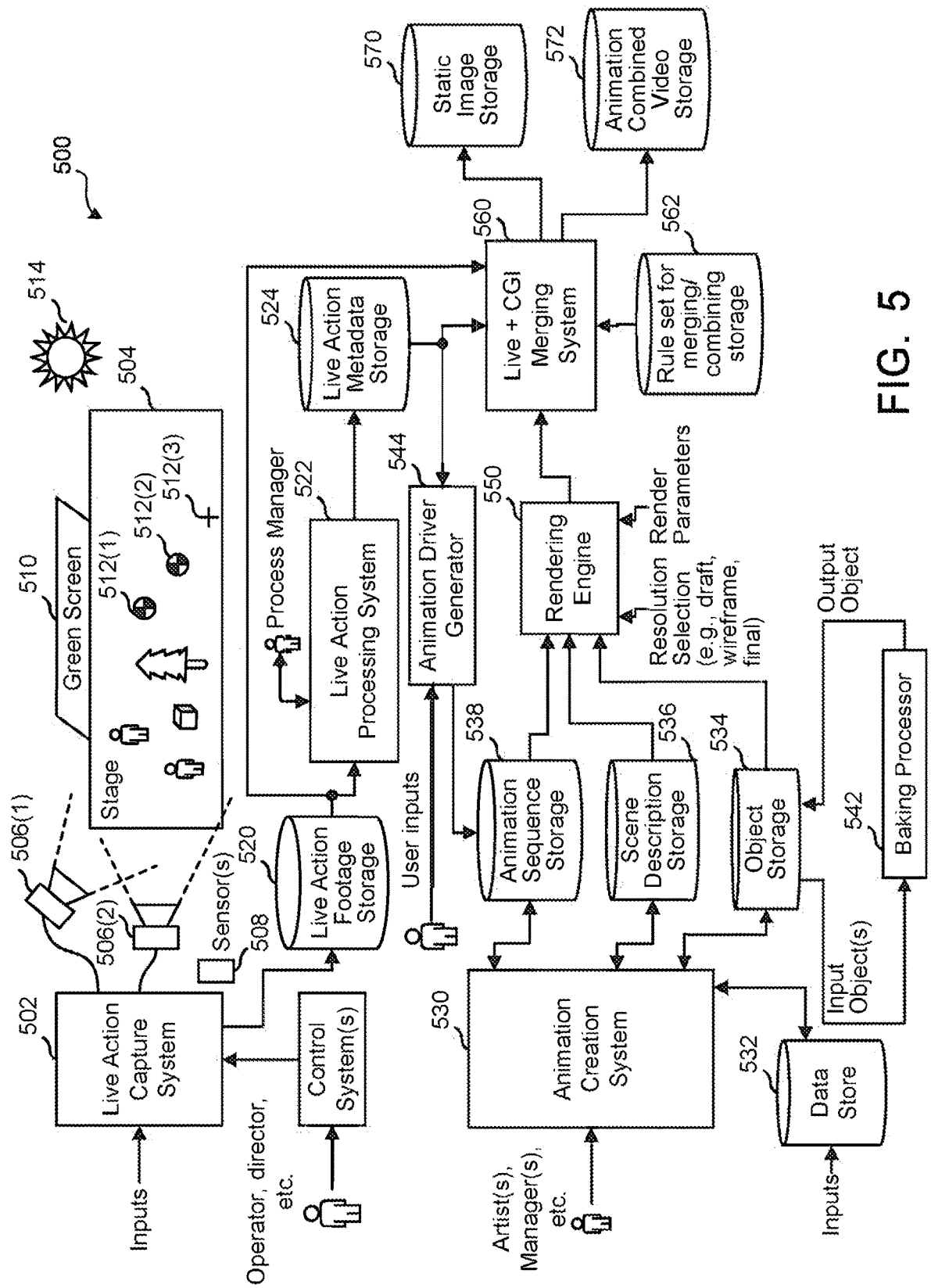
FIG. 5 illustrates an example visual content generation system as might be used to generate imagery in the form of still images and/or video sequences of images.

For example, some or all of process 300 may be performed by any suitable system, such as by an application server, by multiple computing devices in a distributed system of a computing resource service provider, or by any electronic computing device such as computer system 400 of FIG. 4, which may be a member of an animation creation system, such as the animation system 530 component of the of visual content generation system 500 depicted in FIG. 5. The process 300 includes a series of operations wherein a set of constraints for generation of a cubic spline are obtained and, for each of the points except the two outer points on a surface that the curve is to follow but not intersect, a rigid transformation is performed on the preceding point and the succeeding point. Then, the cubic spline may be computed based on an operation performed to a matrix of the points and the preceding and succeeding point transformations.

In step 302, the system performing the process 300 obtains a set of constraints for the generation of the cubic spline. The set of constraints may include a set of points in a virtual space approximating curve corresponding to a surface that the cubic spline is constrained not to intersect. In some embodiments, the set of constraints may include a velocity value.

In step 304, the system performing the process 300 may begin iterating through the set of points. Because the rigid transformation performed in step 308 is performed on a preceding point to the current point, the system may start the iteration with the succeeding/next point after the start point of the set of points.

In step 306, the system performing the process 300 may determine a tangent plane to the surface at the point.

In step 308, the system performing the process 300 may perform a rigid transformation on the preceding point to the point being processed to determine a first intersecting point corresponding to the preceding point that intersects with the tangent plane.

In step 310, the system performing the process 300 may perform a rigid transformation on the succeeding point to the point being processed to determine a second intersecting point corresponding to the succeeding point that intersects with the tangent plane.

In step 312, the system performing the process 300 may determine whether it has iterated through all of the points, and if not, returns to 304 to perform the steps of 304-312 against the next point in the set of points. Because the rigid transformation in step 310 is performed on a succeeding point to the current point, the iterating can end at the second to the last point in the set of points.

The system performing the process 300 may retain the first and second intersecting points as steps 306-312 are performed for each of the points, thereby producing sets of first and second intersecting points. In step 314, the system performing the process 300 may generate a matrix based on the points and the sets of first and second intersecting points, similar to the matrix described in conjunction with FIG. 2.

Lastly, in step 316, the system performing the process 300 may, solve the resultant matrix from the start point to the end point to produce the cubic spline. The cubic spline may subsequently be rendered as a fiber (e.g., a hair, a rope, a thread, etc.) or may serve as a center line guide for generating a more complex flexible object (e.g., a braid, a snake, a hose, etc.). Note that one or more of the operations performed in steps 302-316 may be performed in various orders and combinations, including in parallel.

Steps 302-316 describe one possible implementation of techniques of the present disclosure. It is contemplated that other implementations are possible. For example, in an alternative implementation, for each point $x_k$ find its closest point $p_k$ on the surface S. Then, for each pair of consecutive points $[x_k, x_{k+1}]$, compute a rigid transformation $M_k (R_k, T_k)$ according to $x_k$, $x_{k+1}$, $p_k$ and $p_{k+1}$ as described above in conjunction with FIGS. 2A-2C.

FIG. 4 illustrates a system for generating and placing one or more surface-constrained splines within a computer animation, in an embodiment. The system includes a surface and spline dataset 402, a spline processing unit 406, a renderer 418, a user interface (UI) 420, and spline input data 422.

A user 440 may interact with the UI 420 to define one or more splines that is to be constrained by a surface such that the spline does not intersect the surface when one or more points or vertices for the spline are designated and/or moved. This spline may therefore correspond to a fiber that is used to be placed relative to a surface. Spline input data 422 may indicate, for example, the criteria for the spline, such as the curvature, polynomials, placement, vertices, and the like of the spline. Surface and spline dataset 402 may store data for surfaces used to constrain splines, such as characters, creatures, or objects. Spline dataset 402 may be loaded with data from a source of an animation, such as a tessellated mesh, subdivision surface, or the like used to define a character, creature, or object. Spline processing unit 406 may utilize the methods and processes described herein to take spline input data 422 and constrain the corresponding spline according to the surface utilized with the spline from spline dataset 402. The spline processing unit 406 may constrain the spline using the points and vertices of the spline (e.g., data defining a cubic spline or the like) with the corresponding tangent planes to the surface, as described herein.

Spline processing unit 406 includes a processor 410 that executes program code 412 to constrain splines designated in spline input data 422 using a surface 414 from surface and spline dataset 402. Spline processing unit 406 may further store surface and spline data 408 to dataset 402 so that the corresponding surface and fibers represented by the splines may be rendered by renderer 418 for a realistic a scene visualization using fibers corresponding to the splines. For example, spline processing unit 406 may initiate the process by taking spline input data 422 with surface 414 and constraining the spline by surface 414 so that a surface-constrained spline 416 does not intersect surface 414. Based on surface-constrained spline 416, spline processing unit 406 may then output surface and spline data 408, which may include spline parameters 404 stored by dataset 402 as well as other required data to reproduce and constrain the spline by the corresponding surface. Spline processing unit 406 may then move to the next spline designated by user 440 and further constrain additional splines by surface 414 or another surface. The resulting constrained splines and/or surfaces may be rendered by rendered 418 and/or output to user 440 to inspect the results.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

As one skilled in the art will appreciate in light of this disclosure, certain embodiments may be capable of achieving certain advantages, including some or all of the following: (1) Techniques described and suggested in the present disclosure improve the field of computing, especially the field of digital animation, by improving the computation time to calculate complex curves that follow the surface of a digital model. (2) Additionally, techniques described and suggested in the present disclosure improve the efficiency of computing systems by, since the computation time to calculate complex curves is reduced, to compute and render more complex and realistic models in digital animation sequences. (3) Moreover, techniques described and suggested in the present disclosure are necessarily rooted in computer technology in order to overcome problems specifically arising with how to generate complex curves to simulate realistic fibers or other flexible objects within the computational and time constraints of producing a digital animation product.

For example, FIG. 5 illustrates the example visual content generation system 500 as might be used to generate imagery in the form of still images and/or video sequences of images. Visual content generation system 500 might generate imagery of live action scenes, computer generated scenes, or a combination thereof. In a practical system, users are provided with tools that allow them to specify, at high levels and low levels where necessary, what is to go into that imagery. For example, a user might be an animation artist, such as user 440 depicted in FIG. 4 and might use visual content generation system 500 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 500 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, a user might be an animation artist, such as user 440 depicted in FIG. 4 and might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 5, a live action capture system 502 captures a live scene that plays out on a stage 504. Live action capture system 502 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 506(1) and 506(2) capture the scene, while in some systems, there might be other sensor(s) 508 that capture information from the live scene (e.g., infrared cameras, infrared sensors, motion capture ("mo-cap") detectors, etc.). On stage 504, there might be human actors, animal actors, inanimate objects, background objects, and possibly an object such as a green screen 510 that is designed to be captured in a live scene recording in such a way that it is easily overlaid with computer-generated imagery. Stage 504 might also contain objects that serve as fiducials, such as fiducials 512(1)-(3), that might be used post-capture to determine where an object was during capture. A live action scene might be illuminated by one or more lights, such as an overhead light 514.

During or following the capture of a live action scene, live action capture system 502 might output live action footage to a live action footage storage 520. A live action processing system 522 might process live action footage to generate data about that live action footage and store that data into a live action metadata storage 524. Live action processing system 522 might include computer processing capabilities, image processing capabilities, one or more processors, program code storage for storing program instructions executable by the one or more processors, as well as user input devices and user output devices, not all of which are shown.

Live action processing system 522 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 514, as that might be useful in post-processing to match computer-generated lighting on objects that are computer-generated and overlaid on the live action footage. Live action processing system 522 might operate autonomously, perhaps based on predetermined program instructions, to generate and output the live action metadata upon receiving and inputting the live action footage. The live action footage can be camera-captured data as well as data from other sensors.

An animation creation system 530 is another part of visual content generation system 500. Animation creation system 530 might include computer processing capabilities, image processing capabilities, one or more processors, program code storage for storing program instructions executable by the one or more processors, as well as user input devices and user output devices, not all of which are shown. Animation creation system 530 might be used by animation artists, managers, and others to specify details, perhaps programmatically and/or interactively, of imagery to be generated. From user input and data from a database or other data source, indicated as a data store 532, animation creation system 530 might generate and output data representing objects (e.g., a horse, a human, a ball, a teapot, a cloud, a light source, a texture, etc.) to an object storage 534, generate and output data representing a scene into a scene description storage 536, and/or generate and output data representing animation sequences to an animation sequence storage 538.

Scene data might indicate locations of objects and other visual elements, values of their parameters, lighting, camera location, camera view plane, and other details that a rendering engine 550 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 530 might be interactive, allowing a user to read in animation sequences, scene descriptions, object details, etc. and edit those, possibly returning them to storage to update or replace existing data. As an example, an operator might read in objects from object storage into a baking processor 542 that would transform those objects into simpler forms and return those to object storage 534 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 532 might be used to drive object presentation. For example, if an artist is creating an animation of a spaceship passing over the surface of the Earth, instead of manually drawing or specifying a coastline, the artist might specify that animation creation system 530 is to read data from data store 532 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 544 might read in live action metadata, such as data representing movements and positions of body parts of a live actor during a live action scene. Animation driver generator 544 might generate corresponding animation parameters to be stored in animation sequence storage 538 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 522. Animation driver generator 544 might convert that movement data into specifications of how joints of an articulated CGI character are to move over time.

A rendering engine 550 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 550 might include computer processing capabilities, image processing capabilities, one or more processors, program code storage for storing program instructions executable by the one or more processors, as well as user input devices and user output devices, not all of which are shown.

Visual content generation system 500 can also include a merging system 560 that merges live footage with animated content. The live footage might be obtained and input by reading from live action footage storage 520 to obtain live action footage, by reading from live action metadata storage 524 to obtain details such as presumed segmentation in captured images segmenting objects in a live action scene from their background (perhaps aided by the fact that green screen 510 was part of the live action scene), and by obtaining CGI imagery from rendering engine 550.

A merging system 560 might also read data from rulesets for merging/combining storage 562. A very simple example of a rule in a ruleset might be "obtain a full image including a two-dimensional pixel array from live footage, obtain a full image including a two-dimensional pixel array from rendering engine 550, and output an image where each pixel is a corresponding pixel from rendering engine 550 when the corresponding pixel in the live footage is a specific color of green, otherwise output a pixel value from the corresponding pixel in the live footage."

Merging system 560 might include computer processing capabilities, image processing capabilities, one or more processors, program code storage for storing program instructions executable by the one or more processors, as well as user input devices and user output devices, not all of which are shown. Merging system 560 might operate autonomously, following programming instructions, or might have a user interface or programmatic interface over which an operator can control a merging process. In some embodiments, an operator can specify parameter values to use in a merging process and/or might specify specific tweaks to be made to an output of merging system 560, such as modifying boundaries of segmented objects, inserting blurs to smooth out imperfections, or adding other effects. Based on its inputs, merging system 560 can output an image to be stored in a static image storage 570 and/or a sequence of images in the form of video to be stored in an animated/combined video storage 572.

Thus, as described, visual content generation system 500 can be used to generate video that combines live action with computer-generated animation using various components and tools, some of which are described in more detail herein. While visual content generation system 500 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 6:
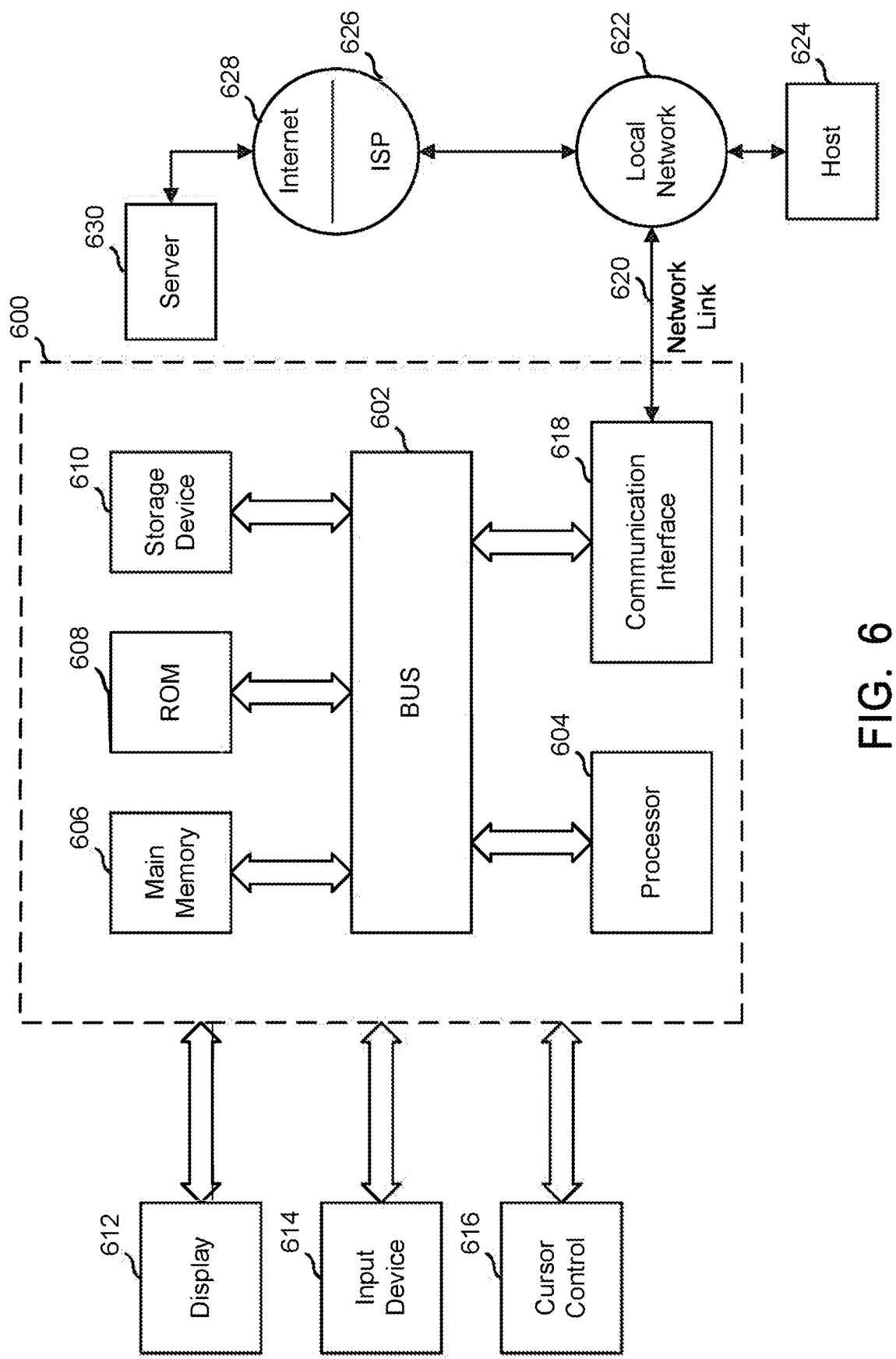
FIG. 6 is a block diagram illustrating an example computer system upon which computer systems of the systems illustrated in FIGS. 1 and 5 may be implemented.

For example, FIG. 6 is a block diagram that illustrates a computer system 600 upon which the computer systems of the systems described herein and/or visual content generation system 500 (see FIG. 5) may be implemented. Computer system 600 includes a bus 602 or other communication mechanism for communicating information, and a processor 604 coupled with bus 602 for processing information. Processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 may also be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a computer monitor, for displaying information to a computer user. An input device 614, including alphanumeric and other keys, is coupled to bus 602 for communicating information and command selections to processor 604. Another type of user input device is a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610.

Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a network connection. A modem or network interface local to computer system 600 can receive the data. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be a network card, a modem, a cable modem, or a satellite modem to provide a data communication connection to a corresponding type of telephone line or communications line. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620, and communication interface 618. In the Internet example, a server 630 might transmit a requested code for an application program through the Internet 628, ISP 626, local network 622, and communication interface 618. The received code may be executed by processor 604 as it is received, and/or stored in storage device 610, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer modeling system for generating a spline relative to a curved surface of an object in a three-dimensional (3D) space represented by the computer modeling system, the computer modeling system comprising:
 a user interface configured to receive, via a user interface widget in the user interface, a plurality of inputs comprising a starting point of the spline, an ending point of the spline, and an association of the spline with the curved surface of the object within the 3D space represented by the computer modeling system;
 a spline processing unit executed by at least one hardware processor and configured to project one or more vertices of the spline on the curved surface of the object, determine a bending rigid transformation for the spline based on equal distance points in the 3D space from the one or more projected vertices, determine approximated points for the spline on the curved surface using the bending rigid transformation and heights between the one or more vertices and corresponding projection points of the spline from a user interface widget position of the user interface widget in the user interface, and generate a data structure for the spline based on the plurality of inputs, the bending rigid transformation, and the approximated points; and a renderer configured to output the data structure via the user interface.

2. The computer modeling system of claim 1, wherein at least one of the plurality of inputs is on the curved surface in the 3D space.

3. The computer modeling system of claim 1, wherein the spline processing unit is further configured to construct a discrete derivative that compensates for a curvature of the curved surface, and wherein the data structure is further generated based on the discrete derivative.

4. The computer modeling system of claim 1, wherein the spline processing unit further applies an attraction force between the user interface widget and the one or more vertices when projecting the one or more vertices of the spline on the curved surface.

5. The computer modeling system of claim 1, wherein the ending point comprises a secondary point of the spline within the 3D space.

6. The computer modeling system of claim 1, further comprising a surface and spline dataset having surface data associated with a plurality of surfaces for at least one of a character, a creature, or a digital object, and wherein the bending rigid transformation is further determined based on the surface data from the surface and spline dataset.

7. The computer modeling system of claim 1, wherein the plurality of inputs further comprise a velocity value associated with a movement from the curved surface at the starting point, and wherein the bending rigid transformation is further determined based on the velocity value.

8. The computer modeling system of claim 1, wherein the spline processing unit is further configured to determine an ending point tangent plane through at least one of the starting point or the ending point based on a constraint provided with the plurality of inputs, and wherein the bending rigid transformation is further determined based on the ending point tangent plane.

9. A computer-implemented method for generating a spline relative to a curved surface of an object in a three-dimensional (3D) space represented by a computer modeling system, the computer-implemented method comprising:

displaying a user interface of the computer modeling system;

receiving a plurality of inputs comprising a starting point of the spline, an ending point of the spline, and an association of the spline with the curved surface of the object within the 3D space represented by the computer modeling system;

executing a spline processing unit by at least one hardware processor;

projecting one or more vertices of the spline on the curved surface of the object;

determining a bending rigid transformation for the spline based on equal distance points in the 3D space from the one or more projected vertices;

determining approximated points for the spline on the curved surface using the bending rigid transformation and heights between the one or more vertices and corresponding projection points of the spline from a user interface widget position of the user interface widget in the user interface;

generating a data structure for the spline based on the plurality of inputs, the bending rigid transformation, and the approximated points; and rendering the data structure via the user interface.

10. The computer-implemented method of claim 9, wherein at least one of the plurality of inputs is on the curved surface in the 3D space.

11. The computer-implemented method of claim 9, further comprising:

constructing a discrete derivative that compensates for a curvature of the curved surface, wherein the data structure is further generated based on the discrete derivative.

12. The computer-implemented method of claim 9, further comprising:

applying an attraction force between the user interface widget and the one or more vertices when projecting the one or more vertices of the spline on the curved surface.

13. The computer-implemented method of claim 9, wherein the ending point comprises a secondary point of the spline within the 3D space.

14. The computer-implemented method of claim 9, further comprising:

accessing a surface and spline dataset having surface data associated with a plurality of surfaces for at least one of a character, a creature, or a digital object, wherein the bending rigid transformation is further determined based on the surface data from the surface and spline dataset.

15. The computer-implemented method of claim 9, wherein the plurality of inputs further comprise a velocity value associated with a movement from the curved surface at the starting point, and wherein the bending rigid transformation is further determined based on the velocity value.

16. The computer-implemented method of claim 9, further comprising:

determining an ending point tangent plane through at least one of the starting point or the ending point based on a constraint provided with the plurality of inputs, wherein the bending rigid transformation is further determined based on the ending point tangent plane.

17. A system comprising: at least one hardware processor, and a storage medium storing instructions, which when executed by the at least one hardware processor, cause the system to implement the computer-implemented method of claim 9.

18. A non-transitory computer-readable storage medium storing instructions, which when executed by at least one processor of a computer system, causes the computer system to carry out the computer-implemented method of claim 9.

19. A non-transitory computer-readable medium carrying instructions, which when executed by at least one processor of a computer system, causes the computer system to carry out the computer-implemented method of claim 9.

20. A non-transitory carrier medium carrying image data that includes pixel information generated according to the computer-implemented method of claim 9.

* * * * *